United States Patent [19]
Raskin et al.

[11] Patent Number: 5,657,409
[45] Date of Patent: Aug. 12, 1997

[54] OPTOELECTRIC INTERCONNECT AND METHOD FOR INTERCONNECTING AN OPTICAL FIBER WITH AN OPTOELECTRIC DEVICE

[75] Inventors: Glenn D. Raskin, Phoenix; Daniel B. Schwartz, Apache Junction, both of Ariz.

[73] Assignee: Motorola, Inc., Schaumburg, Ill.

[21] Appl. No.: 623,244

[22] Filed: Mar. 28, 1996

[51] Int. Cl.$^6$ .................................................. G02B 6/36
[52] U.S. Cl. .............................. 385/88; 385/89; 385/92
[58] Field of Search .............................. 385/88–94

[56] References Cited

U.S. PATENT DOCUMENTS

| | | | |
|---|---|---|---|
| 4,862,272 | 8/1989 | Karlock | 358/181 |
| 5,093,879 | 3/1992 | Bregman et al. | 385/93 |
| 5,416,872 | 5/1995 | Sizer, II et al. | 385/88 |
| 5,420,954 | 5/1995 | Swirhun et al. | 385/92 |

*Primary Examiner*—Phan T. H. Palmer
*Attorney, Agent, or Firm*—Ziye Zhou; Rennie W. Dover

[57] ABSTRACT

An optoelectric interconnect (70) includes an optical fiber (17) coupled to a ferrule (11) and an optoelectric board (20). Metal layer (14) is disposed over a surface (12) of the ferrule (11). An optoelectric device (61) is coupled to the optoelectric board (20) using tape automated bonding tapes (47, 51). The optoelectric board (20) and the ferrule (11) are positioned adjacent each-other so that optical radiation is transmitted from the optoelectric device (61) to the optical fiber (17). The position of the optoelectric device (61) is adjusted to achieve an optimum position which is characterized by a maximum optical radiation transmitted to the optical fiber (17). Upon achieving the optimum position, two bonding strips (54, 56) are fused with the metal layer (14) on the surface (12) of the ferrule (11).

20 Claims, 5 Drawing Sheets

OPTOELECTRIC INTERCONNECT AND METHOD FOR INTERCONNECTING AN OPTICAL FIBER WITH AN OPTOELECTRIC DEVICE

BACKGROUND OF THE INVENTION

The present invention relates, in general, to interconnects and, more particularly, to optical interconnects.

Optical fiber technology is used in a variety of applications such as telecommunication, computer, and medical applications. An important aspect of optical fiber technology is the interconnection of an optical fiber to a device for transmitting or receiving information conducted by the optical fiber.

Coupling an optical fiber to an optoelectronic device is conventionally done using active alignment. To couple a semiconductor laser to an optical fiber, a first end of the optical fiber is placed near a light emitting surface of the laser and a second end of the optical fiber is coupled to a photodetector. The laser is turned on and the position of the first end of the optical fiber is manipulated manually around the light emitting surface of the laser until the photodetector detects a maximum optical radiation signal transmitted through the optical fiber. A molding material such as optical epoxy is then applied to both the laser and the first end of the optical fiber to maintain this optimum coupling. Similarly, a photodetector can be coupled to an optical fiber by shining light from a laser into a first end of the optical fiber and manually adjusting the position of a second end of the optical fiber in accordance with the strength of the optical signal transmitted through the optical fiber.

Because the light emitting surface area of a semiconductor laser is very small, coupling a semiconductor laser to an optical fiber is usually time consuming and requires skills of a experienced person. Likewise, the size of a photodetector is small, thus coupling an optical fiber to a photodetector is difficult. Although the size of the photodetector can be increased, this degrades the operating speed and frequency response as well as increases its cost.

Accordingly, it would be advantageous to have a method and a structure for interconnecting an optical fiber with an optoelectronic device. It is desirable for the method to be simple and time efficient. It is also desirable for the structure to be cost efficient.

DETAILED DESCRIPTION OF THE DRAWINGS

Generally, the present invention provides an optoelectric interconnect and a method of interconnecting an optical fiber with an optoelectric device. More particularly, the optoelectric interconnect is comprised of an optical fiber connector coupled with an optoelectric board.

Figure 1:
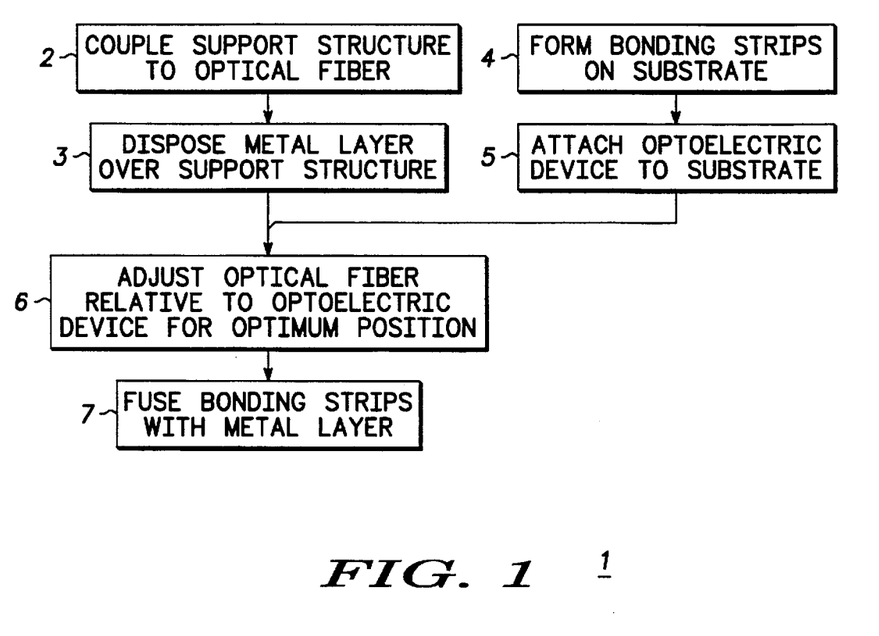
FIG. 1 is a flow chart of a method for interconnecting an optical fiber to an optoelectric device in accordance with the present invention.

FIG. 1 is a flow chart 1 of a method for interconnecting an optical fiber to an optoelectric device such as a semiconductor laser in accordance with the present invention. A support structure such as a ferrule is coupled to a portion of an optical fiber so that a coupling end of the optical fiber protrudes from a major surface of the support structure (box 2 of flow chart 1). A metal layer is disposed over a portion of the major surface of the support structure (box 3 of flow chart 1). The metal layer has an opening surrounding the coupling end of the optical fiber. The optical fiber, the support structure, and the metal layer cooperate to form an optical fiber connector.

An electrically insulating substrate having a plurality of openings is used as the foundation of an optoelectric board. Two bonding strips are formed on portions of a front surface of the electrically insulating substrate (box 4 of flow chart 1). An optoelectric device is positioned in an opening at the center of the substrate and attached to the substrate (box 5 of flow chart 1).

Next, the optical fiber connector and the optoelectric board are held close to each other using, for example, a robot so that the major surface of the support structure faces the substrate and the coupling end of the optical fiber is adjacent an optical region of the optoelectric device. The other end of the optical fiber is coupled to an optical sensor. The optoelectric device is switched on and emits optical radiation from the optical region. The output of the optical sensor is coupled to a microcontroller or a computer. The microcontroller controls the robot to adjust the relative position between the optical fiber connector and the optoelectric board while searching for an optimum position of the coupling end of the optical fiber relative to the optical region of the optoelectric device (box 6 of flow chart 1). The optimum position is achieved when a maximum intensity of the optical radiation is received by the optical sensor. Another technique for aligning the optical fiber connector to the optoelectric board includes selecting a predetermined value of the intensity of the optical radiation depending on the power of the optoelectric device and optical characteristics of the optical fiber. The selected values serves as a threshold intensity. For example, the threshold intensity may be set at 90 to 99 percent of the peak radiation intensity of the optoelectric device. The optimum position is achieved when the optical sensor receives optical radiation more intense than the threshold intensity. The robot can be programmed such that the alignment between the optical fiber and the optoelectric device achieves sub-micron accuracy.

When the optimum position of the coupling end of the optical fiber relative to the optical region of the optoelectric device is achieved, the bonding strips are heated through openings in the substrate and fused with the metal layer disposed over the major surface of the support structure (box 7 of flow chart 1). Suitable techniques for heating the bonding strips include using a laser beam, an ultrasonic wave, a soldering iron, etc. Preferably, an optical underfill material such as, for example, optical epoxy is then injected in a cavity adjacent the major surface of the support structure, the substrate, and the optoelectric device. The type of the underfill material is not a limitation of the present invention. For example, the underfill material may be silica gel, liquid crystal, or the like.

Figure 2:
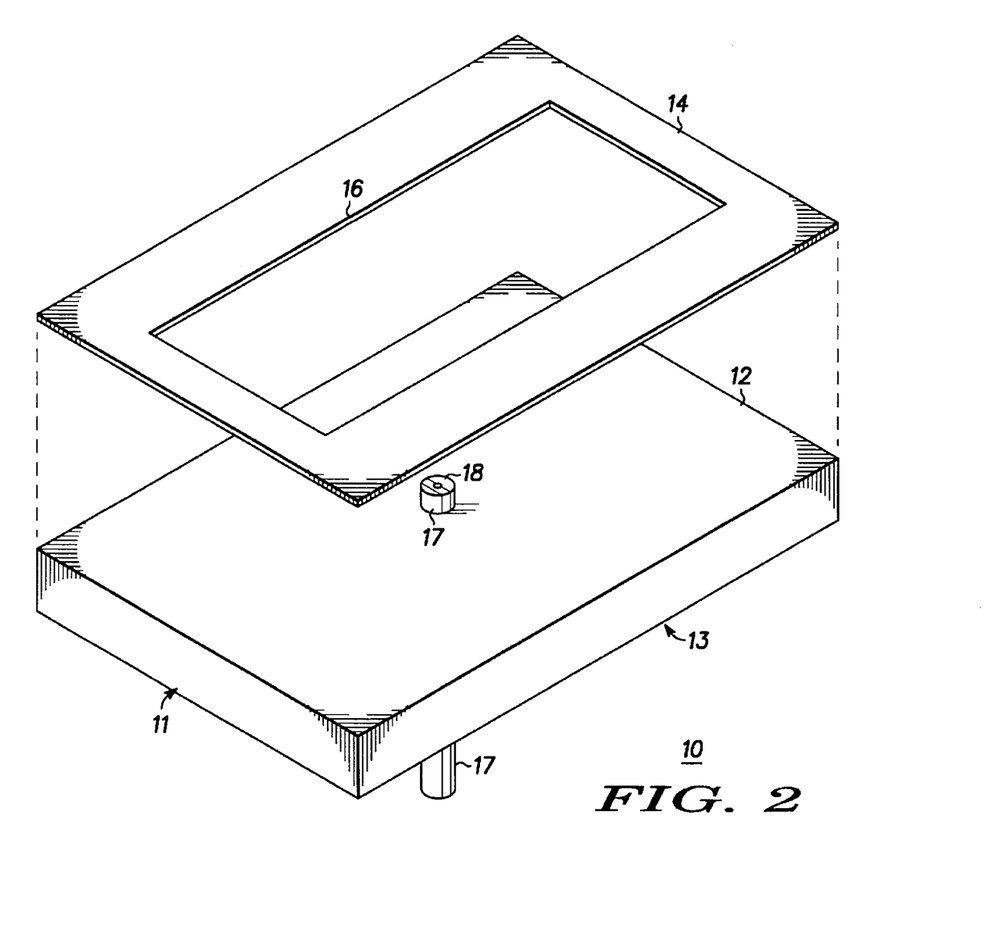
FIG. 2 is an exploded isometric view of an optical fiber connection accordance with the present invention.

FIG. 2 is an exploded isometric view of an optical fiber connector 10 in accordance with the present invention. Optical fiber connector 10 includes an optical fiber support structure 11 having planar top and bottom surfaces 12 and 13, respectively. Although top and bottom surfaces 12 and 13, respectively, are shown and described as being planar, this is not a limitation of the present invention. Support structure 11 is formed using molding techniques known to those skilled in the art. Suitable materials for support structure 11 include silicon, liquid crystal polymer, ceramics, molding plastics, metals, etc.

Optical fiber connector 10 further includes a metal layer 14 disposed over top surface 12. For example, metal layer 14 is coupled to top surface using an epoxy (not shown). Metal layer 14 has an opening 16 which is preferably centrally located within metal layer 14. It should be noted that the method and materials for coupling metal layer 14 to top surface 12 and the location of opening 16 are not limitations of the present invention. For example, metal layer 14 can be mechanically clamped, thermally fused, or deposited on support structure 11. Suitable materials for metal layer 14 include copper, nickel, tin, gold, and the like.

An optical fiber 17 having a coupling end 18 is embedded in support structure 11. Thus, support structure 11 serves as a ferrule. More particularly, optical fiber 17 extends from bottom surface 13 through support structure 11 and protrudes from top surface 12, wherein coupling end 18 of optical fiber 17 extends into opening 16. Although FIG. 2 shows that coupling end 18 protrudes from top surface 12, this is not a limitation of the present invention. For example, coupling end 18 may be planar with top surface 12 or slightly recessed beneath top surface 12 in support structure 11.

Figure 3:
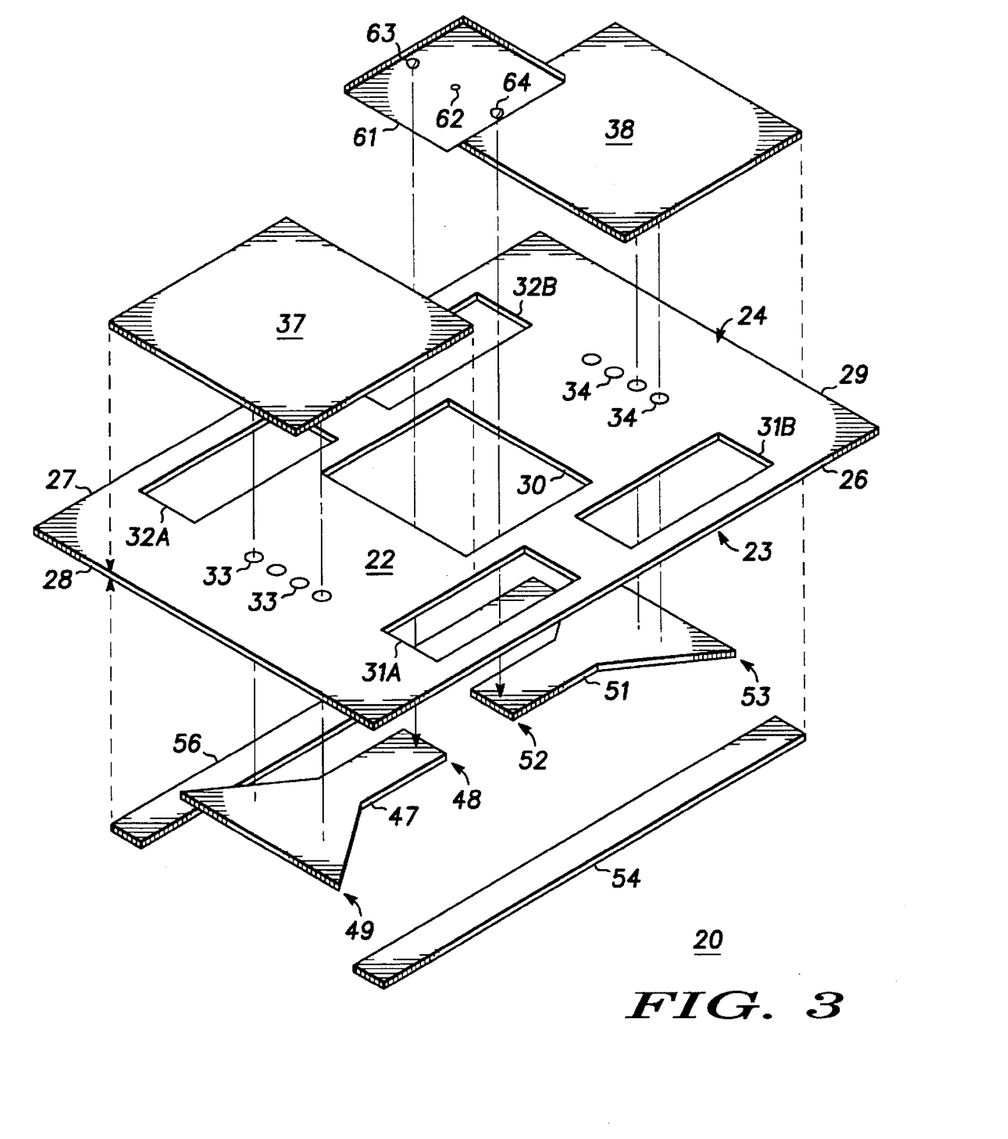
FIG. 3 is an exploded isometric view of an optoelectric board in accordance with the present invention.

FIG. 3 illustrates an exploded isometric view of an optoelectric board 20 in accordance with the present invention. Typically, optoelectric board 20 includes an optoelectronic device such a semiconductor laser, a light emitting diode, a photodetector, etc. and is therefore also referred to as an optoelectronic board. Optoelectric board 20 includes a substrate 22 having front and back surfaces 23 and 24, respectively, opposing sides 26 and 27, and opposing sides 28 and 29. Substrate 22 is preferably made of a flexible dielectric material such as, for example, polyimide.

Substrate 22 further includes a light transmission opening 30, access openings 31A, 31B, 32A and 32B, and vias 33 and 34. Preferably, light transmission opening 30 is a square shaped opening located in a central portion of substrate 22; access openings 31A and 31B are rectangularly shaped, spaced-apart openings located adjacent side 26 of substrate 22; and access openings 32A and 32B are rectangularly shaped, spaced-apart openings located adjacent side 27 of substrate 22. Further, one set of vias 33 are linearly aligned to each other and located adjacent side 28 and another set of vias 34 are linearly aligned to each other and located adjacent side 29 of substrate 22. Vias 33 and 34 are filled with a conductive material such as, for example, copper, gold, solder, nickel, tin, etc. Thus vias 33 and 34 are also referred to as electrically conductive vias or conductors. It should be noted that the number, location, and relative positioning of vias 33 and 34 shown in FIG. 3 are not intended as the limitations of the present invention. In other words, there may be a greater or lessor number of vias, and they may be positioned in locations other than those illustrated in FIG. 3.

In accordance with one embodiment of the present invention, square-shaped conductors 37 and 38 are attached to back surface 24 using, for example, epoxy (not shown). Conductor 37 is adjacent vias 33 and electrically connected to the conductive material in vias 33. Likewise, conductor 38 is adjacent vias 34 and electrically connected to the conductive material in vias 34. It should be noted that conductors 37 and 38 are also coupled to external circuits (not shown). Suitable materials for conductors 37 and 38 include gold plated copper, nickel, tin, gold, etc.

Optoelectric board 20 further includes a mounting structure 47 having a rectangularly shaped coupling portion 48 and a triangularly shaped bonding portion 49. Mounting structure 47 is attached to front surface 23 using, for example, epoxy (not shown). Mounting structure 47 is positioned such that rectangularly shaped coupling portion 48 extends into the area adjacent light emitting opening 30 from a side adjacent to vias 33 and triangularly shaped bonding portion 49 is adjacent vias 33. In other words, rectangularly shaped coupling portion 48 is exposed through light transmission opening 30. In addition, optoelectric board 20 includes a mounting structure 51 having a rectangularly shaped coupling portion 52 and a triangularly shaped bonding portion 53. Mounting structure 51 is attached to front surface 23 using, for example, epoxy (not shown). Mounting structure 51 is positioned such that rectangularly shaped coupling portion 52 extends into the area adjacent light emitting opening 30 from a side adjacent to vias 34 and triangularly shaped bonding portion 53 is adjacent vias 34. In other words, rectangularly shaped coupling portion 52 is exposed through light transmission opening 30. By way of example, mounting structures 47 and 51 are tape automated bonding (TAB) tapes comprised of a polyimide substrate coated with gold plated copper. It should be noted that the substrate of mounting structures 47 and 51 may be any semi-flexible dielectric material. Other conductive coatings for the TAB tapes include nickel, tin, gold, etc. The conductive coating on mounting structures 47 and 51 are electrically coupled to conductors 37 and 38, respectively, through the conductive material in vias 33 and 34, respectively. It should be noted that the shapes and sizes of mounting structures 47 and 51 are not limited to the shapes and sizes shown in FIG. 3. Preferably, mounting structures 47 and 51 fit into opening 16 in coupling metal layer 14 when optical fiber connector 10 and optoelectric board 20 are interconnected with each other as described hereinafter with reference to FIG. 4. Thus, mounting structures 47 and 51 are electrically insulated from metal layer 14.

Optoelectric board 20 further includes bonding strips 54 and 56 attached to front surface 23. More particularly, bonding strip 54 is aligned to side 26 and is adjacent or partially blocks access openings 31A and 31B. Similarly, bonding strip 56 is aligned to side 27 and is adjacent or partially blocks access openings 32A and 32B. By way of example, bonding strips 54 and 56 are metal strips such as solder plated copper, nickel, tin, gold, etc. It should be noted that the shapes of bonding strips 54 and 56 are not limited to being rectangular or that the shape of bonding strip 54 is not limited to being the same as the shape of bonding strip 56. Bonding strips 54 and 56 can be any shape as long as they provide sufficient surface area to be fused with metal layer 14 during the formation of the optoelectric interconnect.

In addition, optoelectric board 20 includes an optoelectric device 61 which includes an optical region 62, and conductive bumps 63 and 64. By way of example, optoelectric device 61 is a vertical cavity surface emitting laser (VCSEL) that includes an aperture from which optical radiation is emitted in a direction perpendicular to the front surface of optoelectric device 61. The aperture of the VCSEL is represented in FIG. 3 by optical region 62. It should be understood that optoelectric device 61 is not limited to being a VCSEL. Optoelectric device 61 can be any device which converts an electrical signal to an optical signal or vice versa. For example, optoelectric device 61 may be a light emitting diode, a photodetector, or the like. Conductive bumps 63 and 64 serve as the electrodes of optoelectric device 61 and are mechanically coupled to substrate 22. Conductive bump 63 is positioned to mate with coupling portion 48 and conductive bump 64 is positioned to mate with coupling portion 52. More particularly, conductive bumps 63 and 64 are bonded to coupling portions 48 and 52, respectively, using TAB technology such as, for example, gold—gold thermal compression, gold-tin eutectic bonding, or the like. Thus, mounting structures 47 and 51 serve to conduct electrical signals from external circuits (not shown) to optoelectric device 61 via conductors 37 and 38 and vias 33 and 34 and to conduct heat away from optoelectric device 61.

Although optoelectric device 61 is described in FIG. 3 as including one aperture (represented by optical region 62), this is not intended as a limitation of the present invention. Depending on the application, optoelectric device 61 may include any number of apertures, wherein each aperture emits or receives optical radiation. It should be noted that the number of conductive bumps on optoelectric device 61 is related to the number of apertures. Preferably, there is at least one conductive bump corresponding to each aperture in optoelectric device 61.

Figure 4:
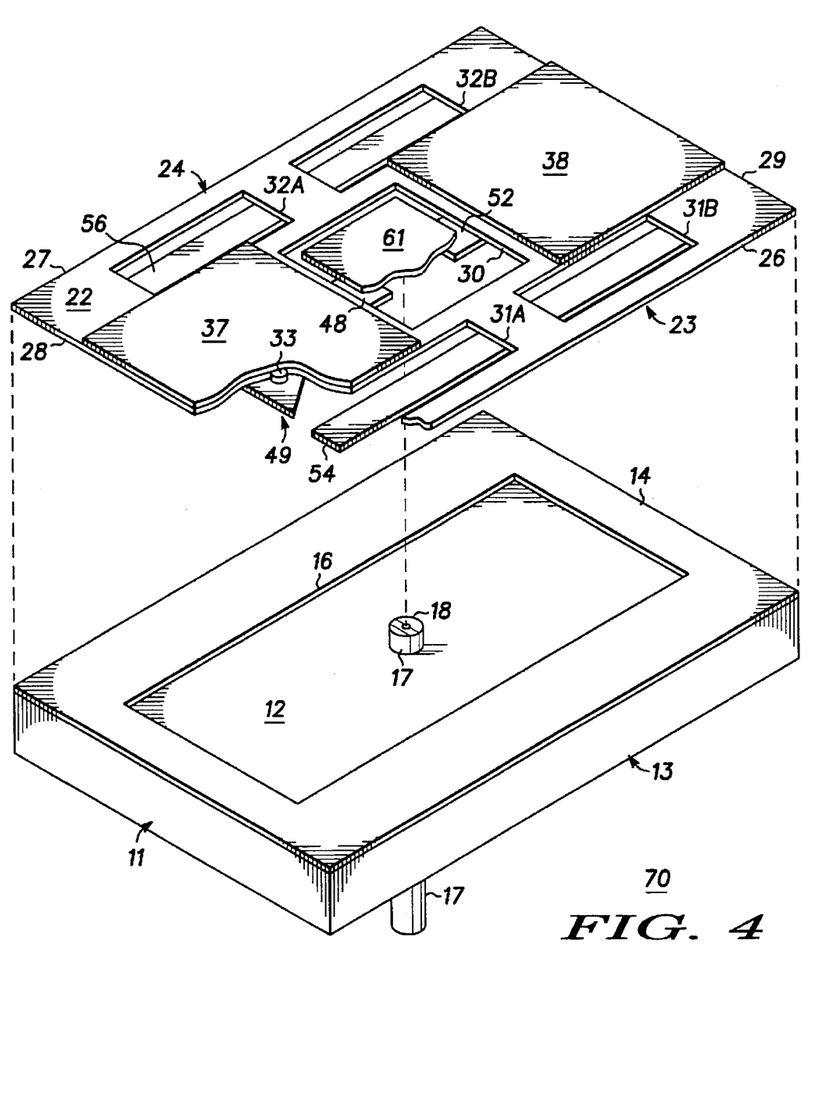
FIG. 4 is an exploded partially cut-away isometric view of an optoelectric interconnect which includes the optical fiber connector of FIG. 1 interconnected with the optoelectric board of FIG. 3.

FIG. 4 is an exploded partially cut-away isometric view of an optoelectric interconnect 70 which includes optical fiber connector 10 of FIG. 2 interconnected with optoelectric board 20 of FIG. 3. It should be understood that the same reference numerals are used in the figures to denote the same elements. Before coupling optical fiber connector 10 with optoelectric board 20, optical fiber connector 10 and optoelectric board 20 are placed adjacent to each other so that metal layer 14 is adjacent to front surface 23 of substrate 22 and coupling end 18 of optical fiber 17 is adjacent to optical region 62 (shown in FIG. 3). Optoelectric device 61 is turned on by a current flowing in a conduction path from conductor 37 to conductor 38 through conductive vias 33, mounting structure 47, conductive bump 63, optoelectric device 61, conductive bump 64, mounting structure 51, and conductive vias 34 (shown in FIG. 3). Optoelectric device 61 emits optical radiation through optical region 62 when it is on. A second end (not shown) of optical fiber 17 is coupled to an optical sensor (not shown) which monitors the optical radiation transmitted through optical fiber 17. The relative position between optical fiber connector 10 and optoelectric board 20 is adjusted to optimize the optical radiation signal transmitted through optical fiber 17. In other words, an optimum position of optical fiber connector 10 relative to optoelectric board 20 is characterized by a maximum intensity of the optical radiation being received by the optical sensor.

Because optical fiber connector 10 is surface mounted to optoelectric board 20, coupling end 18 of optical fiber 17 can be positioned very close to optical region 62 of optoelectric device 61 compared with prior art coupling techniques. As described with reference to FIG. 1, the alignment process can be performed by a robot under the control of a microcontroller. When performed using a robot programmed in accordance with the optical characteristics of optoelectric device 61 and optical fiber 17, the alignment can be time efficient and accurate, e.g., reach an accuracy in the submicron level.

Figure 5:
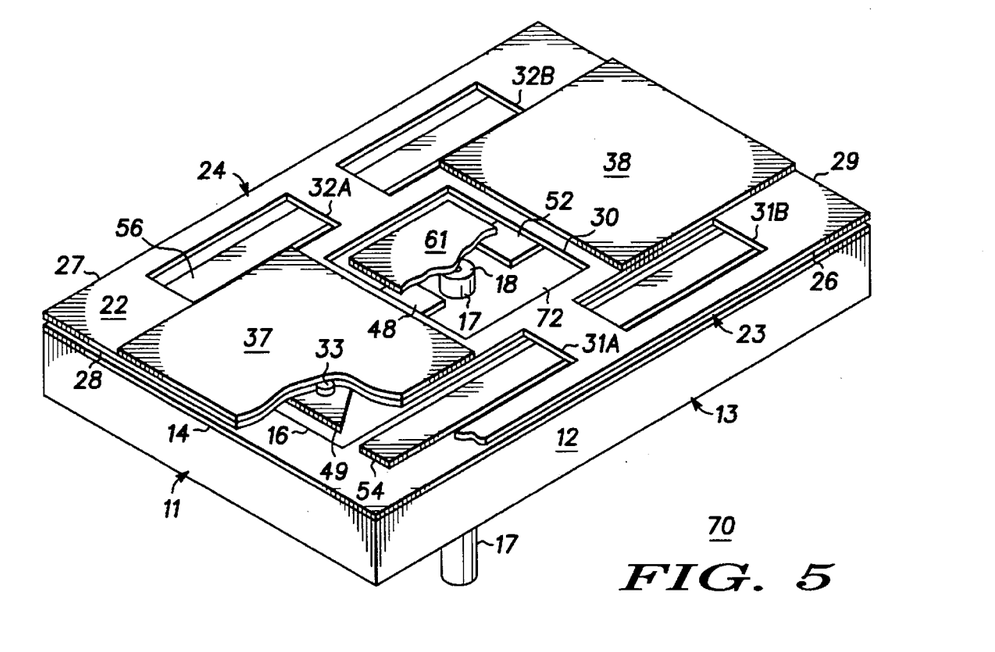
FIG. 5 is a partially cut-away isometric view of the optoelectric interconnect of FIG. 4.

After the optimum position is achieved, bonding strips 54 and 56 on front surface 23 of substrate 22 are fused or soldered to metal layer 14, forming optoelectric interconnect 70. An assembled partially cut-away isometric view of optoelectric interconnect 70 is illustrated in FIG. 5. By way of example, the fusing of bonding strips 54 and 56 to metal layer 14 is achieved by heating and partially melting solder plated bonding strips 54 and 56. Heating bonding strips 54 and 56 may be accomplished using a laser beam, an ultrasonic wave, a soldering iron, or the like, through access openings 31A, 31B, 32A, and 32B. The fusing process is faster and less likely to displace coupling end 18 of optical fiber 17 relative to optoelectric device 61 than the prior art bonding techniques such as molding, clamping, fastening, etc. Therefore, the fusing process of the present invention typically results in more accurate optical coupling than prior art techniques.

Preferably, a protective material such as, for example, an optical underfill material is injected to fill a cavity 72 between optical fiber connector 10 and optoelectric board 20 (shown in FIG. 5). Suitable materials for the optical underfill material include optical epoxy, liquid crystal polymer, silica gel, or the like. The protective material serves to protect coupling end 18 of optical fiber 17 and optoelectric device 61 from moisture and other contaminants in the atmosphere. Furthermore, the protective material serves to strengthen the coupling between optical fiber connector 10 and optoelectric board 20.

As described with reference to FIG. 3, optoelectric device 61 may be a photodetector. When interconnecting coupling end 18 of optical fiber 17 with a photodetector, the other end of optical fiber 17 is coupled to an optical radiation source such as a laser, a light emitting diode, or the like. The optimum alignment between the optical fiber 17 and the photodetector is achieved when the photodetector on optoelectric board 20 detects a maximum intensity of the optical radiation transmitted through optical fiber 17.

By now it should be appreciated that a method and a structure for interconnecting an optical fiber with an optoelectric device have been provided. In accordance with the present invention, an optical fiber is surface mounted to a surface emitting laser device such as a VCSEL, thereby providing a higher coupling efficiency than coupling an optical fiber to an edge emitting laser device. The fusing technique of the present invention provides a fast bonding process for coupling an optical fiber to an optoelectric device which is less likely to displace the optical fiber and the optoelectric device than prior art techniques. When using a robot to perform the alignment and assembly of the optoelectric interconnect package, the present invention provides a time efficient method for coupling an optical fiber to an optoelectric device that is highly manufacturable and does not require the skills of an experienced operator. Therefore, the present invention provides a low cost package which is able to transmit a signal at a high speed over a long distance. Although most beneficial to single mode optical fiber applications because of the small cross sectional area of a single mode optical fiber, the present invention is also applicable to multimode optical fiber applications.

We claim:

1. A method for interconnecting an optical fiber with an optoelectric device having an optical region, comprising the steps of:

providing an optical fiber connector, wherein the step of providing an optical fiber connector includes the steps of:

providing a support structure having a major surface and a metal layer disposed over the major surface, wherein the metal layer has an opening; and coupling the support structure to the optical fiber, a first end of the optical fiber extending into the opening of the metal layer;

providing an optoelectric board, wherein the step of providing an optoelectric board includes the steps of:
providing a substrate having first and second opposing surfaces and a first opening;
forming at least one bonding strip on a portion of the first surface of the substrate; and
securing the optoelectric device in the first opening of the substrate;

aligning the optical fiber to the optoelectric device by adjusting a position of the first end of the optical fiber relative to the optical region of the optoelectric device in accordance with an intensity of optical radiation transmittable between the optical fiber and the optoelectric device; and fusing the at least one bonding strip with the metal layer disposed over the major surface of the support structure.

2. The method of claim 1, wherein the step of providing a substrate further includes providing the substrate having a second opening.

3. The method of claim 2, wherein the step of fusing the at east one bonding strip with the metal layer further includes partially melting the at least one bonding strip.

4. The method of claim 3, wherein the step of fusing the a least one bonding strip with the metal layer further includes transmitting an ultrasonic wave to the at least one bonding strip through the second opening in the substrate.

5. The method of claim 1, wherein the step of securing the optoelectric device in the first opening of the substrate further includes the steps of:
providing the optoelectric device having a first surface, a first conductive bump and a second conductive bump, wherein the first and second conductive bumps are over the first surface of the optoelectric device; and
securing the optoelectric device in th first opening of the substrate so hat the first surface of the optoelectric device is parallel to the first surface of the substrate.

6. The method of claim 5, wherein the step of securing the optoelectric device in the first opening of the substrate further includes the steps of:
mating a first portion of a first mounting structure to the first conductive bump;
attaching a second portion of the first mounting structure to the first surface of the substrate;
mating a first portion of a second mounting structure to the second conductive bump; and
attaching a second portion of the second mounting structure to the first surface of the substrate.

7. The method of claim 6, further comprising the steps of:
forming first and second conductors on a portion of the second surface of the substrate, wherein the first conductor is electrically insulated from the second conductor;
coupling the first mounting structure to the first conductor using a first conductive via; and
coupling the second mounting structure to the second conductor using a second conductive via.

8. The method of claim 1, wherein the step of aligning the optical fiber to the optical region of the optoelectric device further includes the steps of:
placing the optical fiber connector and the optoelectric board adjacent each other so that the major surface of the support structure is opposite to the first surface of the substrate and the first end of the optical fiber is adjacent the optical region of the optoelectric device;
switching on the optoelectric device;
monitoring an intensity of optical radiation transmitted from the optoelectric device to the optical fiber; and
adjusting a relative position between the optical fiber connector and the optoelectric board until the intensity of the optical radiation reaches a predetermined value.

9. The method of claim 1, wherein the step of aligning the optical fiber to the optical region of the optoelectric device further includes the steps of:
placing the optical fiber connector and the optoelectric board adjacent each other so that the major surface of the support structure faces the first surface of the substrate and the first end of the optical fiber is adjacent the optical region of the optoelectric device;
shining optical radiation into a second end of the optical fiber;
monitoring an intensity of optical radiation transmitted to the optoelectric device through the optical fiber; and
adjusting a relative position between the optical fiber connector and the optoelectric board until the intensity of the optical radiation reaches a predetermined value.

10. The method of claim 1, further comprising the step of filling a cavity adjacent the major surface of the support structure, the first surface of the substrate, and the optoelectric device with a protective material after the step of fusing the at least one bonding strip with the metal layer.

11. A method for interconnecting an optical fiber with an optoelectronic device having first and second electrodes and an aperture, comprising the steps of:
providing a ferrule having a major surface and the optical fiber therein, the optical fiber having first and second ends;
disposing a metal layer over a portion of the major surface of the ferrule, wherein the metal layer has an opening surrounding the first end of the optical fiber;
providing a dielectric substrate having first and second surfaces opposite each other and a plurality of openings;
coupling a plurality of bonding strips to a portion of a first surface of the dielectric substrate adjacent first and second openings of the plurality of openings of the dielectric substrate;
coupling first and second conductors to a portion of a second surface of the dielectric substrate, wherein the first conductor is electrically insulated from the second conductor;
positioning the optoelectronic device in a third opening of the plurality of openings of the dielectric substrate so that the aperture of the optoelectronic device is parallel to the first surface of the dielectric substrate;
coupling the first and second electrodes of the optoelectronic device to the first and second conductors;
aligning the aperture of the optoelectronic device to the first end of the optical fiber; and
fusing the plurality of bonding strips with the metal layer disposed over the major surface of the ferrule.

12. The method of claim 11, further comprising the step of filling a cavity adjacent the major surface of the ferrule, the first end of the optical fiber, the first surface of the dielectric substrate, and the optoelectronic device after the step of fusing the plurality of bonding strips with the metal layer disposed over the major surface of the ferrule.

13. The method of claim 11, wherein the step of aligning the aperture of the optoelectronic device to the first end of the optical fiber further includes the steps of:

positioning the ferrule and the dielectric substrate so that the first end of the optical fiber is adjacent the aperture of the optoelectronic device;

coupling the second end of the optical fiber to an optical sensor;

switching on the optoelectronic device;

monitoring an intensity of optical radiation transmitted from the optoelectronic device to the optical sensor through the optical fiber; and adjusting a relative position between the ferrule and the dielectric substrate until the intensity of the optical radiation reaches a predetermined value.

14. The method of claim 11, wherein the step of aligning the aperture of the optoelectronic device to the first end of the optical fiber further includes the steps of:

positioning the ferrule and the dielectric substrate so that the first end of the optical fiber is adjacent the aperture of the optoelectronic device;

coupling the second end of the optical fiber to an optical radiation source;

monitoring an intensity of optical radiation transmitted from the optical radiation source to the optoelectronic device through the optical fiber; and adjusting a relative position between the ferrule and the dielectric substrate until the intensity of the optical radiation reaches a predetermined value.

15. The method of claim 11, wherein the step of fusing the plurality of bonding strips with the metal layer disposed over the major surface of the ferrule further includes heating the plurality of bonding strips through the first and second openings of the plurality of openings of the dielectric substrate to partially melt the plurality of bonding strips.

16. The method of claim 11, wherein the step of positioning the optoelectronic device in a third opening further includes the steps of:

providing the optoelectronic device having a first conductive bump coupled to the first electrode and a second conductive bump coupled to the second electrode;

mating a first portion of a first bonding tape to the first conductive bump;

attaching a second portion of the first bonding tape to the first surface of the dielectric substrate;

mating a first portion of a second bonding tape to the second conductive bump; and attaching a second portion of the second bonding tape to the first surface of the dielectric substrate.

17. The method of claim 16, wherein the step of coupling first and second electrodes of the optoelectronic device to the first and second conductors further includes electrically coupling the first bonding tape to the first conductor, and electrically coupling the second bonding tape to the second conductor.

18. An optoelectric interconnect, comprising:

an optical fiber connector which comprises:

an optical fiber support structure having first and second major surfaces;

an optical fiber extending from the second major surface of the optical fiber support structure, the optical fiber having an end; and a metal layer disposed over the first major surface of the optical fiber support structure, wherein the metal layer has an opening adjacent the end of the optical fiber; and an optoelectric board which comprises:

a substrate having first and second opposing surfaces, and an opening, wherein the first surface faces the first major surface of the optical fiber support structure;

a first mounting structure having first and second portions, the first portion coupled to the first surface of the substrate and the second portion adjacent the opening of the substrate;

a second mounting structure having first and second portions, the first portion coupled to the first surface of the substrate and the second portion adjacent the opening of the substrate;

an optoelectric device having first and second conductive bumps and an optical region, wherein the first conductive bump is coupled to the second portion of the first mounting structure, the second conductive bump is coupled to the second portion of the second mounting structure, and the optical region faces the first major surface of the optical fiber support structure; and a bonding strip formed on a portion of the first surface of the substrate, wherein the bonding strip is coupled to the metal layer.

19. The optoelectric interconnect of claim 18, wherein the optoelectric board further comprises:

a first conductor over a first portion of the second surface of the substrate, the first conductor coupled to the first mounting structure; and a second conductor over a second portion of the second surface of the substrate and electrically insulated from the first conductor, the second conductor coupled to the second mounting structure.

20. The optoelectric interconnect of claim 18, further comprising an underfill material between the first major surface of the optical fiber support structure and the optoelectric device.

* * * * *

UNITED STATES PATENT AND TRADEMARK OFFICE
CERTIFICATE OF CORRECTION

PATENT NO. : 5,657,409
DATED : August 12, 1997
INVENTOR(S) : Glenn D. Raskin
Daniel B. Schwartz It is certified that error appears in the above-indentified patent and that said Letters Patent is hereby corrected as shown below:

Claim 3, column 7, line 25
Delete "east" and insert --least-- therefor.

Claim 4, column 7, line 28
Delete "a" and insert --at-- therefor.

Signed and Sealed this

Eighteenth Day of November 1997

*Attest:*

BRUCE LEHMAN

*Attesting Officer*     *Commissioner of Patents and Trademarks*